(12) United States Patent
Aoki

(10) Patent No.: US 6,856,708 B1
(45) Date of Patent: Feb. 15, 2005

(54) METHOD AND SYSTEM FOR COMPOSING UNIVERSALLY FOCUSED IMAGE FROM MULTIPLE IMAGES

(75) Inventor: Shin Aoki, Tokyo (JP)

(73) Assignee: Ricoh Co., Limited, Tokyo (JP)

( * ) Notice: Subject to any disclaimer, the term of this patent is extended or adjusted under 35 U.S.C. 154(b) by 0 days.

(21) Appl. No.: 09/503,809

(22) Filed: Feb. 15, 2000

(30) Foreign Application Priority Data

Mar. 4, 1999 (JP) ............................................. 11-056461

(51) Int. Cl.[7] .............................. G06K 9/36; G09G 5/00; H04N 7/00
(52) U.S. Cl. ........................ 382/284; 345/629; 348/36
(58) Field of Search ................................. 382/154, 254, 382/255, 263, 264, 266–269, 274, 278, 279, 284, 294, 296, 312; 345/629, 762, 790, 802; 348/36, 64, 207.1, 229, 345, 222.1; 356/125; 359/462, 599

(56) References Cited

U.S. PATENT DOCUMENTS

| | | | | |
|---|---|---|---|---|
| 5,539,494 A | * | 7/1996 | Uchiyama | 354/402 |
| 6,157,783 A | * | 12/2000 | Ide | 396/106 |
| 6,201,899 B1 | * | 3/2001 | Bergen | 382/284 |
| 6,393,162 B1 | * | 5/2002 | Higurashi | 382/284 |
| 6,445,814 B2 | * | 9/2002 | Iijima et al. | 382/154 |
| 6,525,763 B1 | * | 2/2003 | Maeda | 348/96 |

FOREIGN PATENT DOCUMENTS

| | | |
|---|---|---|
| JP | 3-80676 | 4/1991 |
| JP | 8-307756 | 11/1996 |
| JP | 9-73536 | 3/1997 |

OTHER PUBLICATIONS

Kazuya Kodama et al. (Iterative Reconstruction of an All–Focused Image by Using Multiple Differently Focused Images), IEEE 1996.*

"Enhanced Image Acquisition by Using Multiple Differently Focused Images" by Naito et al., Electronics and Information Communication Academy D–II vol. 579–D–II, No. 6, pp 1046–1053 (1996)*.

"Acquisition of an All–Focused Image by the Use of Multiple Differently Focused Images" by Kodama et al., Electronics and Information Communication, D–II, vol. 80–D–II, No. 9, pp 2298–2307 (1997)*.

"Iterative Generation of Arbitrary Focused Images by Using Multiple Differently Focused Images" by Kodama et al., Image Media Symposium, IMPS I–8.15 (1996)*.

* cited by examiner

*Primary Examiner*—Kanjibhai Patel
(74) *Attorney, Agent, or Firm*—Knoble Yoshida & Dunleavy, LLC

(57) ABSTRACT

The system and method speeds up the image composition process based upon the blurring function and the blurring function determination process; facilitates the confirmation and correction of the blurring function determination results; determines the relative position of image data and to enable the position match for the difficult image data that is corrected for the zoom ratio; and facilitates the confirmation and the correction of the image data relative positioning results.

45 Claims, 7 Drawing Sheets

FIG. 4

HIGH PASS FILTER COEFFICIENTS FOR IN-FOCUS AREA DETERMINATION

| 0  | -1 | 0  |
|----|----|----|
| -1 | 4  | -1 |
| 0  | -1 | 0  |

FIG. 6

LOW PASS FILTER COEFFICIENTS FOR BLURRING FUNCTION

| 1 | 2 | 1 |
|---|---|---|
| 2 | 4 | 2 |
| 1 | 2 | 1 |

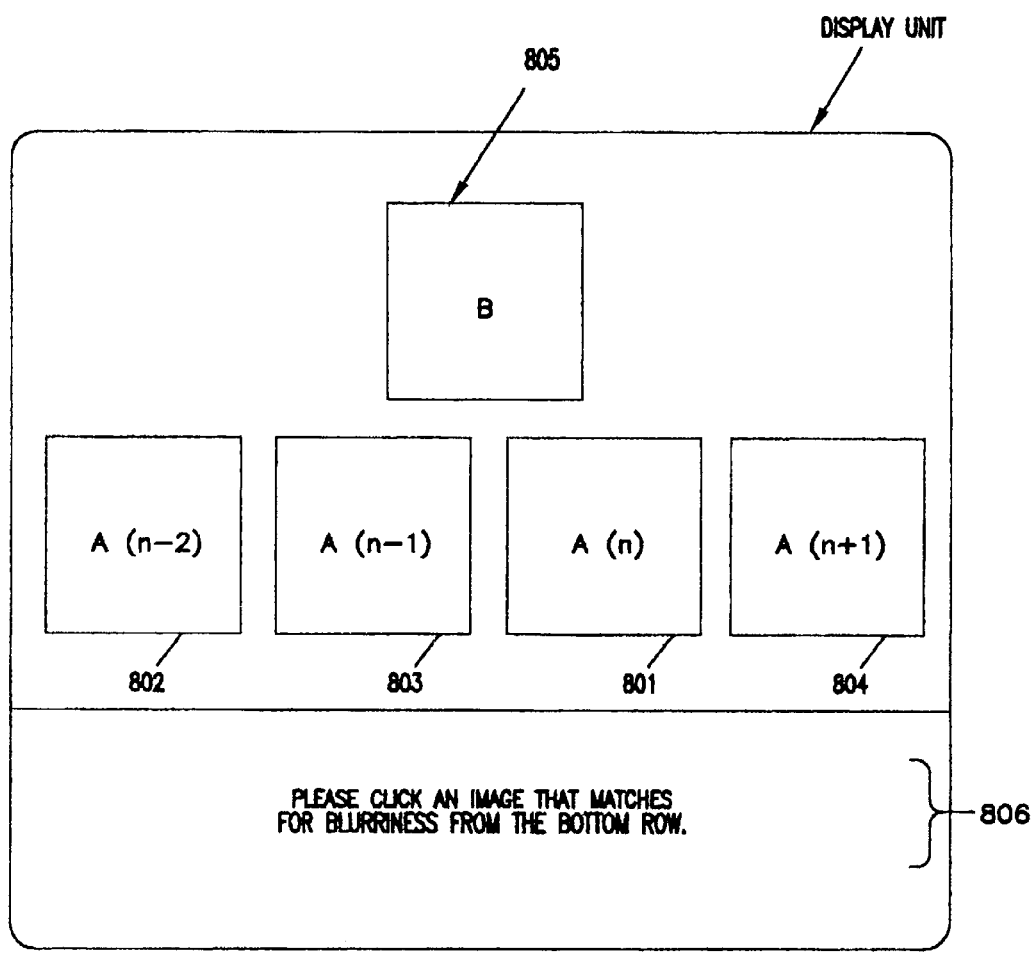

METHOD AND SYSTEM FOR COMPOSING UNIVERSALLY FOCUSED IMAGE FROM MULTIPLE IMAGES

FIELD OF THE INVENTION

The current invention is generally related to the generation of a pan-focus image data based upon a series of images taken at a different focal length.

BACKGROUND OF THE INVENTION

A number of techniques has been proposed to generate a universally focused pan focus image data based upon a plurality of images data by capturing a common scenery at a different focal point. These techniques are generally grouped into "interactive reconstruction methods" and "select and merge methods." As an example of the select and merge method, Japanese Patent Laid Publication Hei 3-80676 discloses a process where each of a plurality of the input images is divided into blocks and the corresponding blocks are compared for an amount of high frequency portion. Based upon the comparison, the brightness is determined, and an image block containing more of the high frequency portion is selected and merged into a universally focused image. Another example of the select and merge method is Japanese Patent Laid Publication Hei 8-307756, which discloses a technique where a bright portion is selected based upon a change in intensity from a first image that is focused upon an object with a short focal length. The selected bright portion is merged into a corresponding portion of a second image that is focused on another object with a long focal length. In the alternative, an image portion is selected from the first image based upon brightness, and the selected bright portion is merged into the second image at a corresponding position. The selected portion is merged by taking an average of intensity or a change rate in intensity of the corresponding first and second image portions.

Yet another example of the select and merge method in prior art is disclosed in a publication entitled, "Enhanced Image Acquisition by Using Multiple Differently Focused Images" by Naito et al. Electronics and Information Communication Academy D-II Vol. 579-D-II, No. 6, pp 1046–1053 (1996). Each pixel in a first image is compared to a corresponding one in a second image, and the focus of the pixel in the first image is adjusted by applying a predetermined function until it substantially matches with that of the second image. If there is a substantial match, it is assumed that the adjusted pixel of the first image was originally in focus before the adjustment. This process is repeated to determine an in-focus area. The original pixel intensity value is used when the pixel is merged into the universally focused image.

Examples of the interactive reconstruction method includes the publication entitled, "Acquisition of an All-Focused Image by the Use of Multiple Differently Focused Images" by Kodama et al. Electronics and Information Communication, D-II, Vol 80-D-II, No. 9, pp 2298–2307, (1977). The prior art reference discloses a derivation for an equation for generating a universally focused image having multiple focal points at various depths in a scene. The equation is iteratively applied to generate the universally focused image. Similarly, another example, Iterative Generation of Arbitrarily Focused Images by Using Multiple Differently Focused Images. Kodama et al., Image Media Symposium, IMS 96, I-8.18 discloses a technique for generating an image having arbitrarily determined blurness for each depth.

To further illustrate the above iterative reconstruction method by Kodama et al., the following equations are given. It is assumed that a near image and a far image are respectively expressed by f(x) and g(x) while captured images are expressed by I1(x) and I2(x). The whole image I(x) is expressed:

$$f(x) = \begin{cases} I(x) & (d(x) = d_1) \\ 0 & (d(x) = d_2) \end{cases} \quad g(x) = \begin{cases} 0 & (d(x) = d_1) \\ I(x) & (d(x) - d_2) \end{cases} \quad (1)$$

where the depth of the image is d(x)=d1 or d2

$$I(x)=f(x)+g(x) \quad (2)$$

then, $$I_1(x)=f(x)+h_2 g(x) \quad (3)$$

$$I_2(x)=h_1 f(x)+g(x) \quad (4)$$

where h1 and h2 are blur functions. According to this model, equations (2) and (4) lead to $$G(x)=HI(x) \quad (5)$$

and $$G(x)=(h_1-1)I_1(x)+(h_2-1)I_2(x) \quad (6)$$

thus, the following equation is obtained.

$$H=h_1 h_2-1 \quad (7)$$

For each input image, if the blur functions h1 and h2 are known, using the initially reconstructed image I1=I1 or I2.

$$I_{n+1}=(H+1)I_n-G \quad (8)$$

By iteration, the universally focused image is obtained.

Similarly, an arbitrarily focused image Iab is expressed as follows when blur functions ha and hb are respectively used for a near image f(x) and a far image g(x).

$$I_{ab}(x)=h_a f(x)+h_b g(x) \quad (9)$$

Instead of Equation (8), $$G_{ab}=(h_b h_1-h_a)I_i(x)+(h_a h_2-h_b)I_2(X) \quad (10)$$

is considered $$I_{n+1}=(H+1)I_n-G_{ab} \quad (11)$$

for the iterative process for generating the universally focused image. Furthermore, the Kodama et al. reference discloses two ways to determine the blurring function. The first one uses predetermined image capturing conditions including the focal point and at each distance, the blurring function is measured for an object. The second way is that the blurring function is estimated by adjusting the blurness of each pixel as described in the Naito et al. reference.

The above described two groups of prior art techniques are susceptible to errors in generating a universally focused image. In general, the conventional select and merge methods are subject to selection errors, which cause an inferior merged image. The errors are particularly likely near edges where the intensity changes are larger in an out-of-focus image portion than an in-focus image portion.

For the prior-art iterative reconstruction methods, in general, substantially no selection errors are involved. The iterative reconstruction methods do not need information on the location of blurness, and it is possible to generate not only a universally focused image but also an arbitrarily focused image. On the other hand, it is not clear how many iterations are necessary to converge although the Kodama reference discloses only about three iterations. For a large number of iterations, an amount of calculation increases, and it takes a substantial amount of time. In addition, the two proposed techniques for determining the blurring functions also have the following problems. For the first measurement technique, it is necessary to measure the characteristics of the camera as well as other information on each input image such as the focal point length and exposure which affect the blurring function. For these reasons, images taken by an auto focus camera are not usually appropriate for the measurement technique since the auto focus camera generally does not provide information such as the focal point length. The other technique to determine the blurring function based upon the estimation from the image generally requires a large amount of calculation, and it takes a large amount of time. Furthermore, it is difficult for the user to adjust the blurring function.

In addition to the above-described undesirable problems, the prior-art methods also have the following difficulties. Since the zoom ratios usually change as the focal point length is changed, it is necessary to correct at least the zoom ratio of each image before the portions of the images are merged into one composite image. For example, after an auto focus camera is positioned and captures a first image in which a predetermined object is centered, to prepare for capturing a second image, the camera is turned away from the predetermined object and the background scene is focused with the release button. Then, with the above described focus, the camera is turned back towards the predetermined object, and the second image is captured. The second image is centered around the predetermined object. These two images have not only different zoom ratios but also slightly different orientations and positions. The ratio correction alone does not allow the precise positioning of image portions. Images taken by a regular camera without a beam splitter and two CCD's require a high degree of flexible re-positioning technique which includes parallel and rotational movements.

In order to solve the above-described problems, it is desired to quickly generate a high-quality pan focus composite image data from a plurality of common images captured by a generally available auto focus and auto exposure camera. To accomplish the above objectives, it is desired 1) to speed up the image composition process based upon the use of a blurring function, 2) to speed up the blurring function determination process, 3) to facilitate the confirmation and correction of the results by the blurring function, 4) to speculate the relative position of image data and to enable the position match for the difficult image data that is corrected for the zoom ratio, and 5) to facilitate the confirmation and the correction of the image data and the relative positioning results.

SUMMARY OF THE INVENTION

In order to solve the above and other problems, according to a first aspect of the current invention, a method of composing an image from a plurality of images, including: inputing a plurality of the images containing the same objects; determining a relative position between two of the images; determining at least one common in-focus area between the two images; determining an amount of difference in focus in the one common in-focus area between the two images; and composing an image from the two inputted images based upon the above determined amount of the difference in focus.

According to a second aspect of the current invention, a system for composing an image from a plurality of images, including: an input unit for inputting a plurality of the images containing the same objects; and a processing unit connected to the input unit for determining a relative position between two of the images, the processing unit determining at least one common in-focus area between the two images, the processing unit determining an amount of difference in focus in the one common in-focus area between the two images, the processing unit composing an image from the two inputted images based upon the above determined amount of the difference in focus.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 is an exemplary high-pass filter to be used for determining an in-focus area.

FIG. 6 is an exemplary low-pass filter to be used in producing a gradually blurred image.

FIG. 8 is an exemplary software implementation for displaying a series of images that is at a different level of processing.

DETAILED DESCRIPTION OF THE PREFERRED EMBODIMENT(S)

Figure 1:
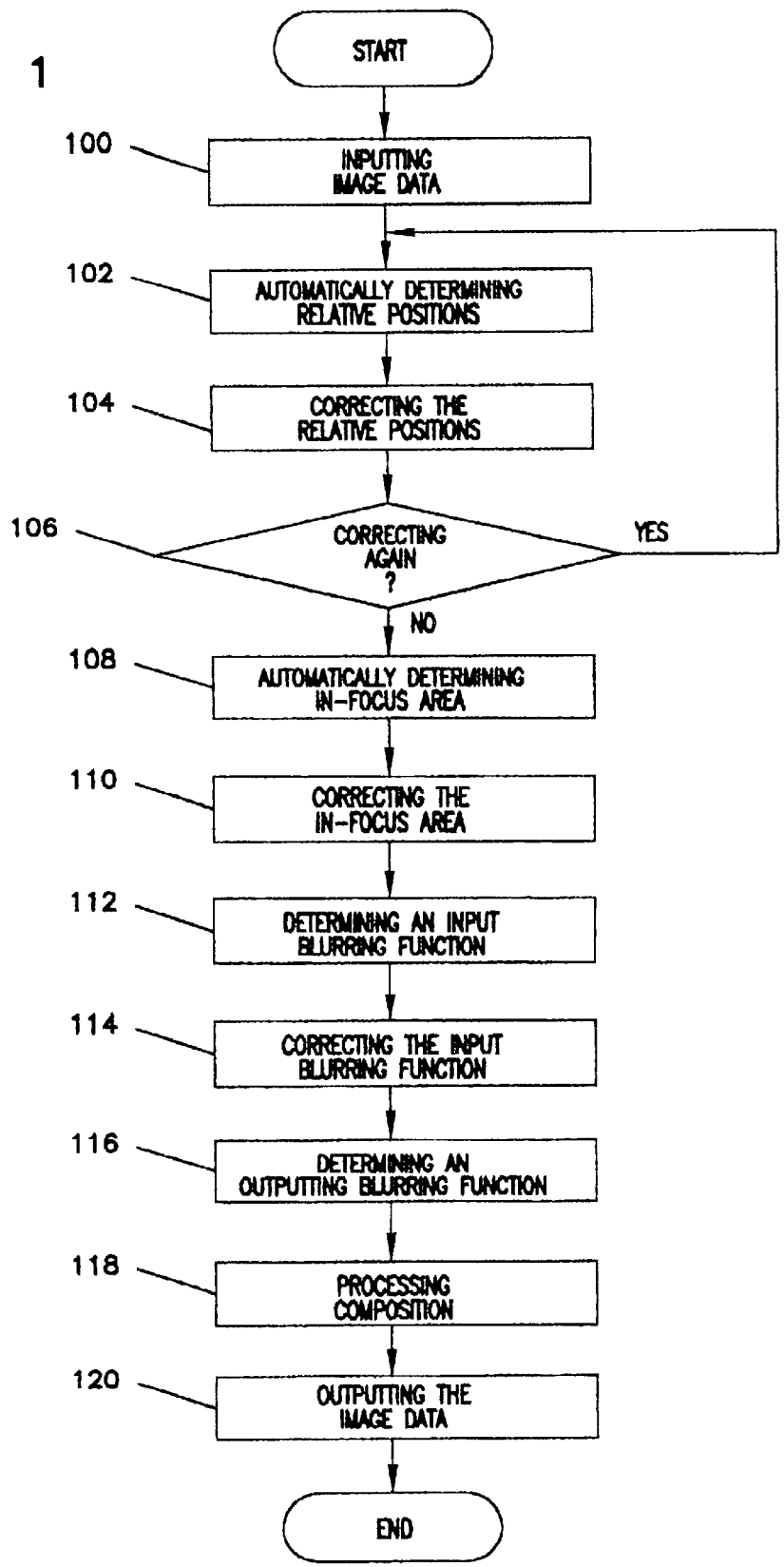
FIG. 1 is a flow chart illustrating acts involved in one preferred process of the image composition according to the current invention.

Referring now to the drawings, wherein like reference numerals designate corresponding structures throughout the views, and referring in particular to FIG. 1, a flow chart illustrates acts involved in one preferred process of the image composition according to the current invention. The preferred process includes a user interface and is implemented as computer software. The preferred process starts by inputting image data in act 100. Two images having a common object are taken by changing the focal point length. One concrete example of the input act is to input digitized image data which have been captured by a digital device. The two images may have some discrepancy in zoom ratio, position and orientation. The relative positions of the inputted data are determined in act 102. As described in Japanese Patent Laid Publication Hei 9-73536, each of the two images is divided into blocks of a certain size. For each block that exceeds a predetermined intensity change, a relative parallel movement is calculated based upon the intensity gradient between two image data sets. The relative position of the two images is determined based upon the polynomial approximation of the relative parallel movement of the blocks. This method allows the determination of the relative position between the two images based upon certain movements including parallel and rotational movements. Since the method for determining a relative position based upon approximated intensity gradient generally ignores minute darkness change and uses a low frequency portion of the image data, it is appropriate to use the relative position determining method regardless of in-focus or out-of-focus image data.

The above determination method assumes that the image data is linear with respect to intensity. However, the digital image data is corrected according to the output characteristics of a device such as a CRT display. For this reason, when the input data is already gamma corrected, prior to the above described relative position determination, the input image data is inversely processed so that the input data is linear with respect to intensity. The gamma characteristic for the inverse correction is used from the image data if available. On the other hand, when the gamma characteristic is not available, 2.2 is generally used. Then, the results of the relative positioning from the act 102 are corrected in act 104. Based upon the relative position determined in the act 102, a first image data set is modified based upon a second image data set which is used as a standard. The modified second image data set and the first image data set are displayed on a screen display unit such as 204. These acts 102 and 104 are repeated until it is determined that the relative position is acceptable in act 106. When the result is to be corrected again, the preferred process goes back to the act 102. On the other hand, when the result is not to be corrected or accepted, the preferred process goes to act 108, where an in-focus area is determined.

To determine the in-focus area, the act 108 relies upon the characteristic that the in-focus area has an increased amount of high-frequency region than the out-of-focus area. The in-focus area determined in act 108 is corrected in act 110. Then, the preferred process determines an input blurring function in act 112 and corrects the input blurring function in act 114 if desired. Similarly, the preferred process determines an output blurring function in act 116. The act 116 outputs an arbitrarily focused image by specifying an output result corresponding to (ha, $h_b$) in equation (9). This act is not necessary when a universally focused image is to be outputted. The act 116 is similar to the act 114 in that an in-focus input image and a series of images produced by multiplying the input image by a set of blurring functions. A user is requested to select one of the series of the images, and the blurring function (ha, $h_b$) used to generate the selected image is outputted. When an image without a blurring function is selected, a universally focused image is outputted. Based upon the above-determined data, the preferred process performs the composition of the images in act 118 before the composite image is outputted in act 120.

Using the determined blurring functions (h1, h2, ha, hb) from the act 114 and 116, the output of the composition process is an iterative reconstruction method. In general, the composition process is an iterative reconstruction method. Although the averaged pixel data has some blur after the two input images have been composed based upon the already determined relative position, the averaged pixel data is a good approximation of the universally focused image. Based upon the above advantageous feature, the average pixel data is used as an initial data set, and the equation (11) is reiterated only once in order to save a substantial amount of time.

The initially reconstructed image is I^O=(I1+I2)/2, and the equation (11) is performed once. After the above processing, the reconstructive image I^I is expressed as follows:

$$I_1 I = \left(\frac{h_1 h_2}{2} - h_1 h_b + h_a\right) I_1 + \left(\frac{h_1 h_2}{2} - h_2 h_a + h_b\right) I_2 \quad (12)$$

The above processing multiples each image data $I_1$ and $I_2$ by a filter ($h_1 h_2/2 - h_1 h_b + h_a$), ($h_1 h_2/2 - h_2 h_a + h_b$) which is determined by a blurring function ($h_1, h_2, h_a, h_b$) and adding the products. The above universally focused image or the arbitrarily focused image are outputted to output devices or storage such as a hard disk 210, a floppy disk 212 and a CRT display unit 204.

Figure 2:
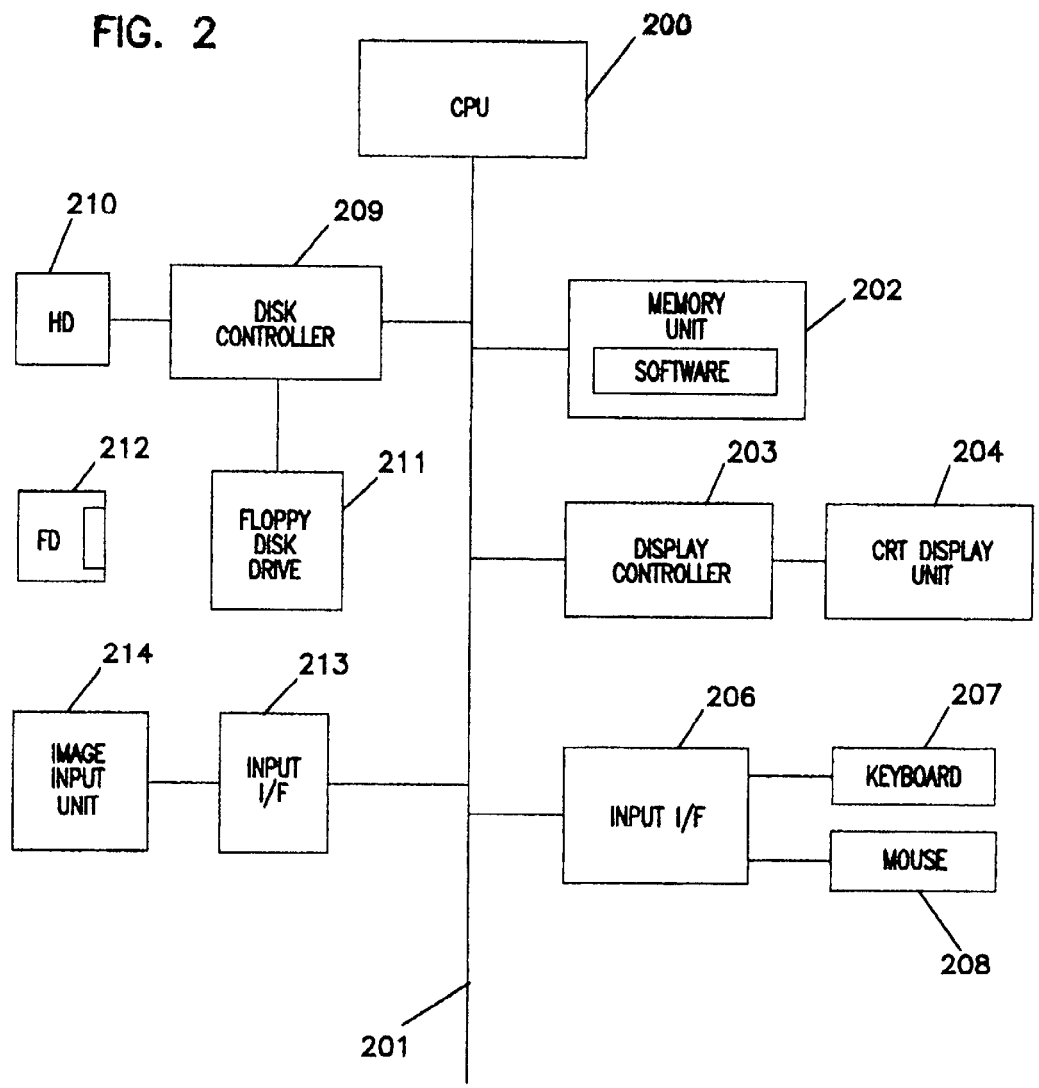
FIG. 2 is a block diagram illustrating one preferred embodiment of the image composition system according to the current invention.

Now referring to FIG. 2, a block diagram illustrates one preferred embodiment of the image composition system according to the current invention. The preferred embodiment includes a central processing unit CPU 200, a memory unit 202 where software or programs run and various input/output devices are connected to the CPU 200 via a bus 201. The input/output devices further include a cathode ray tube (CRT) display unit 204 with a display controller 203; input devices such as a keyboard 207 and a mouse 208 with an input interface 206; memory storage media such as a hard disk 210, a floppy disk 212 with a floppy disk driver (FDD) 211 and a disk controller 209; and an image input unit 214 with an input interface 213. For example, the software for composing the image may be stored in a storage medium such as a floppy disk 212 and is read into the hard disk via the floppy disk drive 211. When the composition program is run, it is loaded into the memory 202. In addition, other storage media such as an optical medium with an optical drive alternatively store the composition program. To input an image, one way is to directly input a digital image captured by a digital camera via the input interface 213. Another example is to scan in via the input interface 213 an image printed from a silver halide film. Yet another example is to input an image from the floppy disk 212.

Figure 3:
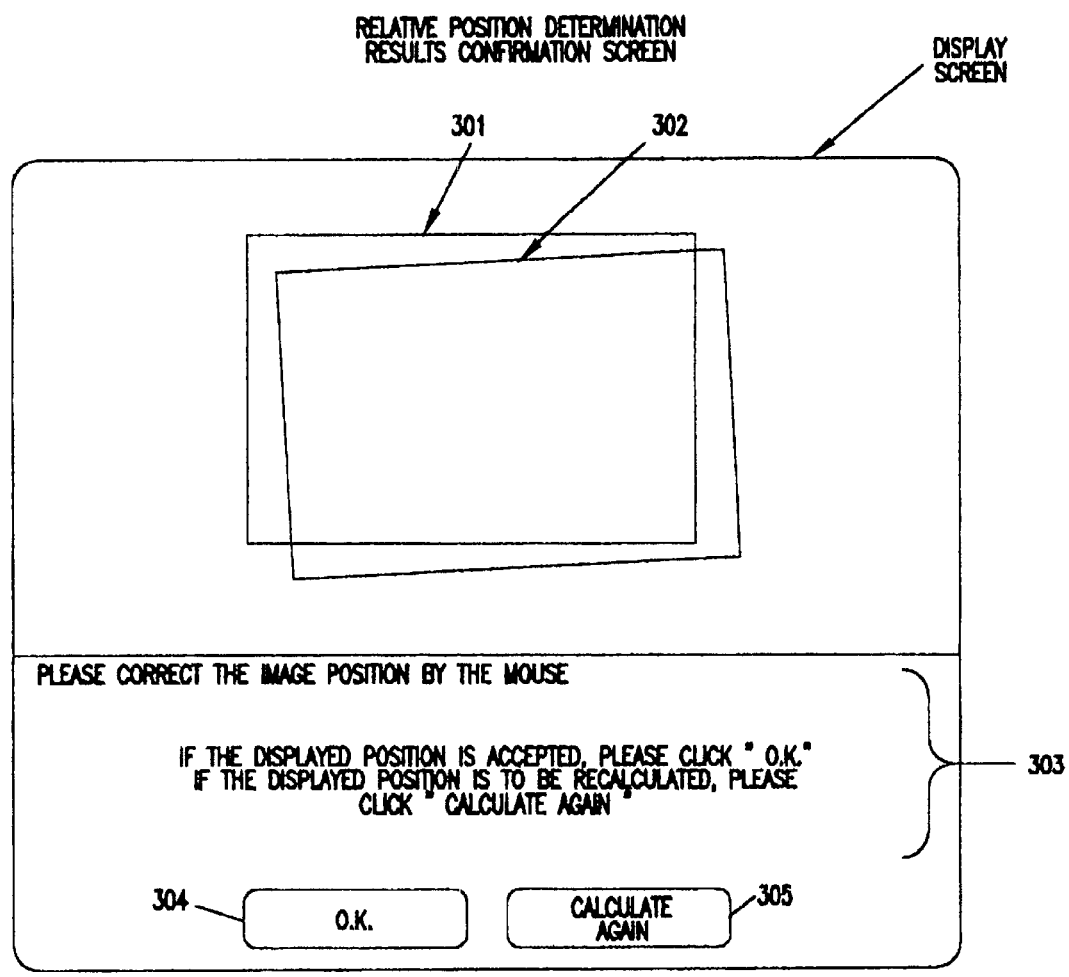
FIG. 3 is a diagram illustrating one exemplary software implementation of the preferred process according to the current invention.

Now referring to FIG. 3, one exemplary software implementation shows a display screen 204 where the act 104 of the preferred process is performed. A first image 301 and a second image 302 are overlappingly displayed. The first image 301 is a standard while the second image 302 is the result of the processing. The display screen 204 includes a message or instruction 303 to a user, an O.K. button 304 for accepting the displayed image and a recalculate button 305 for initiating the calculation process. The user observes and determines whether or not the two images 301 and 302 correctly overlap. If the user determines that the two images correctly overlap, he or she clicks the O.K. button 304 via the mouse 208 of FIG. 2. On the other hand, when the user determines that the two images do not correctly overlap, he or she can either manually move one image over the other via the mouse 208 or clicks the recalculate button 305 for automatically re-calculating the correct position. In any case, the user repeats either a combination of the above-described options until he or she feels satisfied that the overlapping requirements are met. Upon satisfaction, the user clicks the O.K. button 305. When the O.K. button 304 is clicked, the relative position of the two images 301 and 302 is determined, and the preferred process proceeds to the act 108 of the flow chart as shown in FIG. 1. On the other hand, when the recalculate button 305 is clicked, the relative position is recalculated in the act 102.

Now referring to FIG. 4, an exemplary high-pass filter to determine an in-focus area is illustrated. The image data is divided into blocks of 16×16 pixels. After processing with the high-pass filter having the coefficients as shown, each block is added. Assuming that Bij is the sum of pixel values in a block j from the image data i, (B1j−B2j) is larger as a high-frequency portion is larger in a first image 1 than second image 2. In other words, the first image 1 is brighter than the second image. The block having the highest value in B1j−B2j is considered as an in-focus image area of the first image 1. Similarly, the block j having the lowest value in B1j−B2j or having the highest value in B2j−B1j is considered as an in-focus image of the second image 2.

Figure 5:
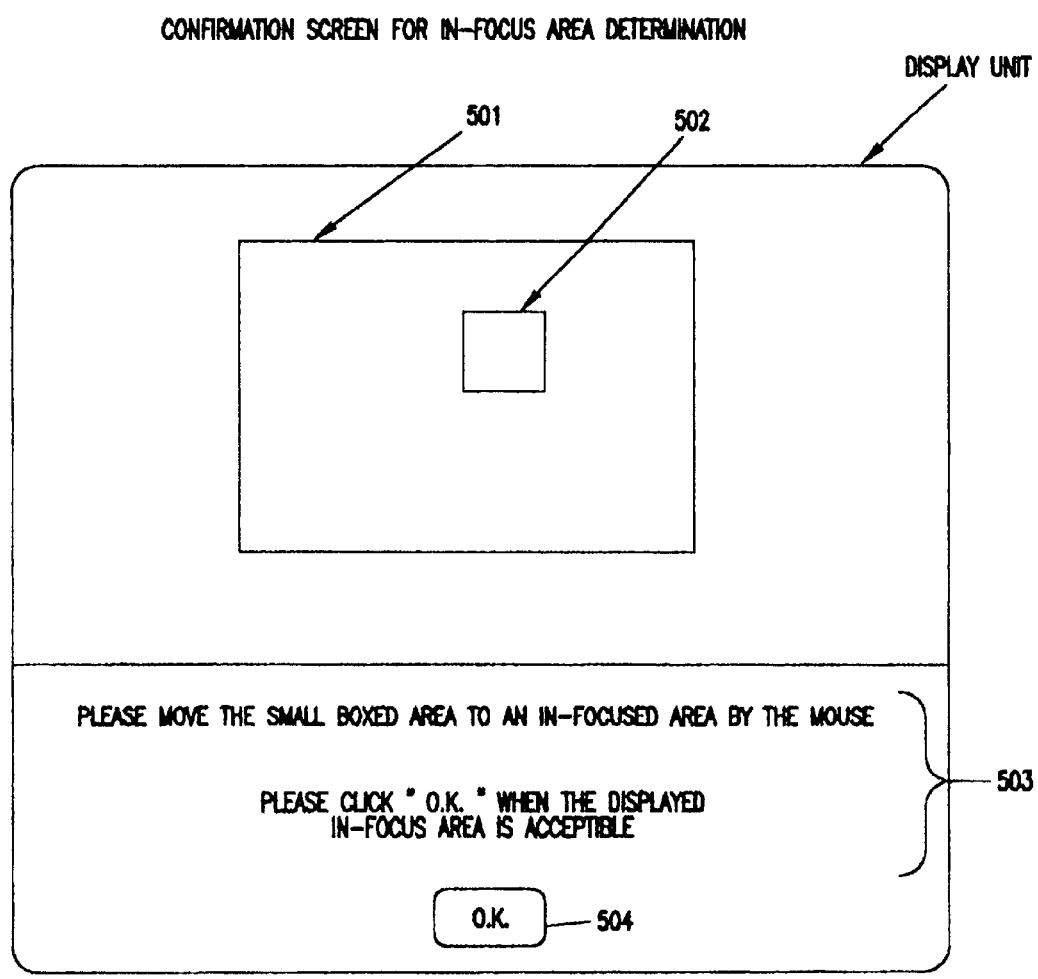
FIG. 5 shows an exemplary software implementation of the preferred process to be used in accepting or correcting the in-focus image areas.

FIG. 5 shows an exemplary software implementation of the act 110 of the preferred process as shown in FIG. 1 for accepting or correcting the above-determined in-focus image areas. The exemplary software implementation shows an image 501, which is either the first image or the second image and an in-focus area 502. The exemplary screen also includes the instruction 503 as well as an O.K. button 504. If the user determines that the in-focus area is correct, he or she clicks the O.K. button 504. On the other hand, if the displayed in-focus area is not acceptable, the user moves the box 502 to a correct in-focus area via the mouse 208 and clicks the O.K. button 504. The above-described operation is repeated for each of the two images. Based upon the above in-focus area as determined in the act 110, a blurring function is applied only to the in-focus area as described in the publication entitled "Enhanced Image Acquisition by Using Multiple Differently Focused Images" by Naito et al. The application of the blurring function produces gradually and sequentially blurred images so that the in-focus area gradually matches with a corresponding out-of-focus area. The gradual application determines the best matched blurring function of the out-of-focused area.

Now referring to FIG. 6, a low-pass filter is used to gradually and iteratively blur an image, and one example of the low-pass filter is illustrated by a set of low-pass filter coefficients. In order to determine a blurring function for a second image data set with respect to a first image data set that has an in-focus area A, a corresponding out-of-focus area is designated as B in the second image data set. Using the above designations, the image data A after a first application of the low-pass filter is designated as A(1), and a second application to the image data A(1) is designated as A(2). Similarly, after n−1 applications to the image data set A is designated as A(n−1), and after nth applications, the image data A is designated as A(n). The sum of a difference between A(n) and the corresponding B in absolute value for each pixel is designated as D(n). According to the above-described procedure, D(1), D(2), D(3) . . . D(n) are sequentially determined, and the minimal value is sought among the above sums. n is a predetermined number. D(1), D(2) and D(3) gradually decrease towards D(n). D(n) is considered to be the minimal when D(n)>D(n+1) is confirmed. Thus, the corresponding image A(n) is considered to be the closest to the image B. As the low-pass filter as shown in FIG. 6 is applied to an image for n times, a blurring function is determined for the second image. Similarly, a blurring function for the first image is also determined in the above-described manner. To determine a blurring function for the first image, an in-focus area of the second image is gradually blurred to match a corresponding out-of-focus area of the first image.

Figure 7:
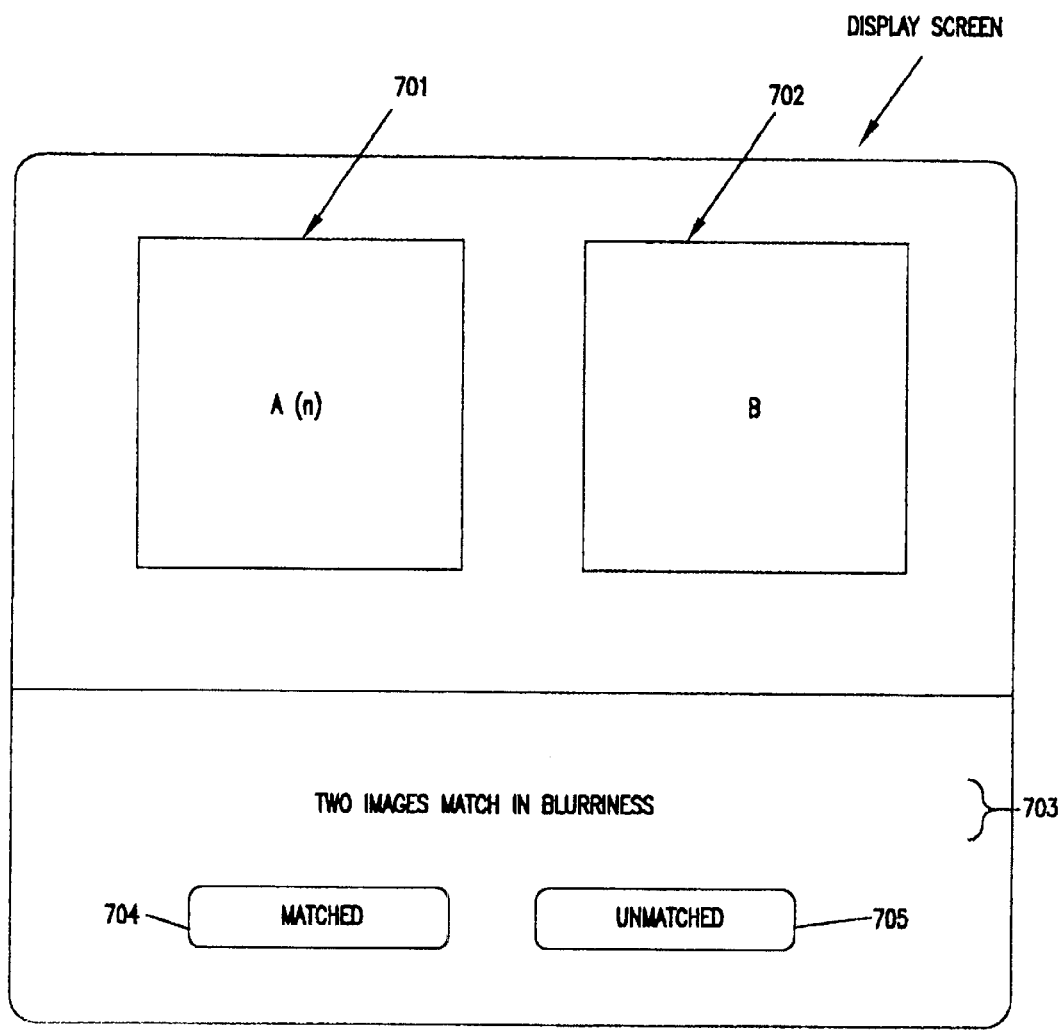
FIG. 7 is one exemplary software implementation of the preferred process according to the current invention.

Now referring to FIG. 7, one exemplary software implementation shows a display screen where the act 114 of the preferred process is performed. The screen display includes an enlarged image A(n) 701 which is generated by applying the above described filter n times to the in-focus image data A of the first image as well as an enlarged image B 702 of the corresponding region of the second image. The screen also includes a message/instructions 703 to the user, a match button 704 and an unmatched button 705. As instructed in the message 703, the user clicks the match button 704 when the image A(n) 701 and the image B 702 match. A blurring function as determined for the second image will be used upon clicking the match button 704. On the other hand, when the operator determines that the image A(n) 701 and the image B 702 do not sufficiently match, the user clicks the unmatched button 705. For further processing takes place when the unmatched button 705 is clicked as will be described with respect to FIG. 8.

Now referring to FIG. 8, an exemplary software implementation involves a screen display of a series of images A(n−2) 802, A(n−1) 803, and A(n+1) 804 which are at a different level of processing of the image A(n). The screen also displays an image B 805 as well as instructions 806. According to the instructions 806, the user selects one of the images 801–804 to best match the image B by clicking the best matched image. Thus, a blurring function that corresponds to the selected image will be used for the second image. After the blurring function for the second image is determined as described above, a blurring function for the first image can be also corrected by a similar mechanism. For the determination of the blurring function for the first image, an in-focus area A of the second image is multiplied by a blurring function to generate the image A(n), and the image data A(n) is displayed as a sample 702 while a corresponding area of the first image is shown as an image B in FIG. 7. Furthermore, the in-focus area of the second image A(n) and the related other images A(n−2), A(n−1) and A(n+1) are displayed as samples 801–804 while a corresponding area of the first image is shown as a sample image B in FIG. 8.

As described above, the preferred embodiments allow generating a composite image which is universally focused or arbitrarily focused based upon two gray-scale images without any other information. For composing from three or more images, the above-described relative position and blurring function are similarly determined. For composing from color images, the similar processes are applicable to each plane of color components or intensity data. In an alternative embodiment, the acts 104, 110 and 114 as described with respect to FIG. 1 are eliminated, and the composite process is automated.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of composing an image from a plurality of images, comprising:

inputting a plurality of the images containing the same objects;

displaying two images for a user input;

determining a relative position between the two of the images based upon the user input according to a predetermined set of movements;

determining at least one common in-focus area between the two images;

determining an amount of difference in focus in the one common in-focus area between the two images; and composing an image from the two inputted images based upon the above determined amount of the difference in focus.

2. The method of composing an image according to claim 1 wherein the in-focus area determination further comprises:

dividing each of the inputted images into a predetermined number of blocks;

summing pixel values of each of the blocks for each of the inputted images;

determining a difference in the summed pixel values between a corresponding pair of the blocks of the inputted images; and selecting a block having a largest amount of the difference in the summed pixel values as the common in-focus area.

3. The method of composing an image according to claim 2 wherein the common in-focus area is user-adjustable.

4. The method of composing an image according to claim 1 wherein the focus difference determination further comprising:

iteratively low-pass filtering the common in-focus area of one of the inputted images;

determining whether or not the low-pass filtered common in-focus area substantially matches the common in-focus area of another inputted images; and determining the amount of the focus difference in the one common in-focus area between the two images based upon a number of the iterative low-pass filtering.

5. The method of composing an image according to claim 4 wherein the amount of the focus difference is user-adjustable.

6. The method of composing an image according to claim 4 wherein the amount of the focus difference is expressed in a blurring function.

7. A system for composing an image from a plurality of images, comprising:

an input unit for inputting a plurality of the images containing the same objects;

a display unit connected to said input unit for displaying two images for a user input; and a processing unit connected to said input unit for determining a relative position between the two of the images based upon the user input according to a predetermined set of movements, said processing unit determining at least one common in-focus area between the two images, said processing unit determining an amount of difference in focus in the one common in-focus area between the two images, said processing unit composing an image from the two inputted images based upon the above determined amount of the difference in focus.

8. The system for composing an image according to claim 7 wherein said processing unit divides each of the inputted images into a predetermined number of blocks, said processing unit summing pixel values of each of the blocks for each of the inputted images, said processing unit determining a difference in the summed pixel values between a corresponding pair of the blocks of the inputted images, said processing unit selecting a block having a largest amount of the difference in the summed pixel values as the common in-focus area.

9. The system for composing an image according to claim 8 wherein the common in-focus area is user-adjustable.

10. The system for composing an image according to claim 7 wherein said processing unit iteratively applies a low-pass filter to the common in-focus area of one of the inputted images, said processing unit determining whether or not the low-pass filtered common in-focus area substantially matches the common in-focus area of another inputted images, said processing unit determining the amount of the focus difference in the one common in-focus area between the two images based upon a number of the iterative low-pass filtering.

11. The system for composing an image according to claim 10 wherein the amount of the focus difference is user-adjustable.

12. The system for composing an image according to claim 10 wherein the amount of the focus difference is expressed in a blurring function.

13. A computer program containing instructions for performing acts of composing an image from a plurality of images, the acts comprising:

inputting a plurality of the images containing the same objects;

displaying two images for a user input;

determining a relative position between the two of the images based upon the user input according to a predetermined set of movements;

determining at least one common in-focus area between the two images;

determining an amount of difference in focus in the one common in-focus area between the two images; and composing an image from the two inputted images based upon the above determined amount of the difference in focus.

14. The computer program according to claim 13 wherein the in-focus area determination further comprises:

dividing each of the inputted images into a predetermined number of blocks;

summing pixel values of each of the blocks for each of the inputted images;

determining a difference in the summed pixel values between a corresponding pair of the blocks of the inputted images; and selecting a block having a largest amount of the difference in the summed pixel values as the common in-focus area.

15. The computer program according to claim 14 wherein the common in-focus area is user-adjustable.

16. The computer program according to claim 13 wherein the focus difference determination further comprising:

iteratively low-pass filtering the common in-focus area of one of the inputted images;

determining whether or not the low-pass filtered common in-focus area substantially matches the common in-focus area of another inputted images; and determining the amount of the focus difference in the one common in-focus area between the two images based upon a number of the iterative low-pass filtering.

17. A method of composing an image from a plurality of images, comprising:

inputting a plurality of the images containing the same objects;

determining a relative position between two of the images;

determining at least one common in-focus area between the two images;

dividing each of the inputted images into a predetermined number of blocks;

summing pixel values of each of the blocks for each of the inputted images;

determining a difference in the summed pixel values between a corresponding pair of the blocks of the inputted images;

selecting a block having a largest amount of the difference in the summed pixel values as the common in-focus area;

determining an amount of difference in focus in the one common in-focus area between the two images; and composing an image from the two inputted images based upon the above determined amount of the difference in focus.

18. The method of composing an image according to claim 17 wherein the common in-focus area is user-adjustable.

19. The method of composing an image according to claim 17 wherein the focus difference determination further comprising:

iteratively low-pass filtering the common in-focus area of one of the inputted images;

determining whether or not the low-pass filtered common in-focus area substantially matches the common in-focus area of another inputted images; and determining the amount of the focus difference in the one common in-focus area between the two images based upon a number of the iterative low-pass filtering.

20. The method of composing an image according to claim 19 wherein the amount of the focus difference is user-adjustable.

21. The method of composing an image according to claim 19 wherein the amount of the focus difference is expressed in a blurring function.

22. A system for composing an image from a plurality of images, comprising:

an input unit for inputting a plurality of the images containing the same objects; and a processing unit connected to said input unit for determining a relative position between two of the images, said processing unit determining at least one common in-focus area between the two images, said processing unit dividing each of the inputted images into a predetermined number of blocks, said processing unit summing pixel values of each of the blocks for each of the inputted images, said processing unit determining a difference in the summed pixel values between a corresponding pair of the blocks of the inputted images, said processing unit selecting a block having a largest amount of the difference in the summed pixel values as the one common in-focus area, said processing unit determining an amount of difference in focus in the one common in-focus area between the two images, said processing unit composing an image from the two inputted images based upon the above determined amount of the difference in focus.

23. The system for composing an image according to claim 22 wherein the common in-focus area is user-adjustable.

24. The system for composing an image according to claim 23 wherein said processing unit iteratively applies a low-pass filter to the common in-focus area of one of the inputted images, said processing unit determining whether or not the low-pass filtered common in-focus area substantially matches the common in-focus area of another inputted images, said processing unit determining the amount of the focus difference in the one common in-focus area between the two images based upon a number of the iterative low-pass filtering.

25. The system for composing an image according to claim 24 wherein the amount of the focus difference is user-adjustable.

26. The system for composing an image according to claim 24 wherein the amount of the focus difference is expressed in a blurring function.

27. A computer program containing instructions for performing acts of composing an image from a plurality of images, the acts comprising:

inputting a plurality of the images containing the same objects;

determining a relative position between two of the images;

determining at least one common in-focus area between the two images;

dividing each of the inputted images into a predetermined number of blocks;

summing pixel values of each of the blocks for each of the inputted images;

determining a difference in the summed pixel values between a corresponding pair of the blocks of the inputted images;

selecting a block having a largest amount of the difference in the summed pixel values as the common in-focus area;

determining an amount of difference in focus in the one common in-focus area between the two images; and composing an image from the two inputted images based upon the above determined amount of the difference in focus.

28. The computer program according to claim 27 wherein the common in-focus area is user-adjustable.

29. The computer program according to claim 27 wherein the focus difference determination further comprising:

iteratively low-pass filtering the common in-focus area of one of the inputted images;

determining whether or not the low-pass filtered common in-focus area substantially matches the common in-focus area of another inputted images; and determining the amount of the focus difference in the one common in-focus area between the two images based upon a number of the iterative low-pass filtering.

30. A method of composing an image from a plurality of images, comprising:

inputting a plurality of the images containing the same objects;

matching a relative position between two of the images based upon a predetermined set of movements;

providing a user input unit for confirming a match in the relative position between the two of the images;

determining at least one common in-focus area between the two images;

determining an amount of difference in focus in the one common in-focus area between the two images; and composing an image from the two inputted images based upon the above determined amount of the difference in focus.

31. The method of composing an image according to claim 30 wherein the in-focus area determination further comprises:
   dividing each of the inputted images into a predetermined number of blocks;
   summing pixel values of each of the blocks for each of the inputted images;
   determining a difference in the summed pixel values between a corresponding pair of the blocks of the inputted images; and
   selecting a block having a largest amount of the difference in the summed pixel values as the common in-focus area.

32. The method of composing an image according to claim 31 wherein the common in-focus area is user-adjustable.

33. The method of composing an image according to claim 30 wherein the focus difference determination further comprising:
   iteratively low-pass filtering the common in-focus area of one of the inputted images;
   determining whether or not the low-pass filtered common in-focus area substantially matches the common in-focus area of another inputted images; and
   determining the amount of the focus difference in the one common in-focus area between the two images based upon a number of the iterative low-pass filtering.

34. The method of composing an image according to claim 33 wherein the amount of the focus difference is user-adjustable.

35. The method of composing an image according to claim 33 wherein the amount of the focus difference is expressed in a blurring function.

36. A system for composing an image from a plurality of images, comprising:
   an input unit for inputting a plurality of the images containing the same objects;
   a user input unit for confirming a match in a relative position between two of the images; and
   a processing unit connected to said input unit and said user input unit for determining the relative position between two of the images based upon a predetermined set of movements, said processing unit determining at least one common in-focus area between the two images, said processing unit determining an amount of difference in focus in the one common in-focus area between the two images, said processing unit composing an image from the two inputted images based upon the above determined amount of the difference in focus.

37. The system for composing an image according to claim 36 wherein said processing unit divides each of the inputted images into a predetermined number of blocks, said processing unit summing pixel values of each of the blocks for each of the inputted images, said processing unit determining a difference in the summed pixel values between a corresponding pair of the blocks of the inputted images, said processing unit selecting a block having a largest amount of the difference in the summed pixel values as the common in-focus area.

38. The system for composing an image according to claim 37 wherein the common in-focus area is user-adjustable.

39. The system for composing an image according to claim 36 wherein said processing unit iteratively applies a low-pass filter to the common in-focus area of one of the inputted images, said processing unit determining whether or not the low-pass filtered common in-focus area substantially matches the common in-focus area of another inputted images, said processing unit determining the amount of the focus difference in the one common in-focus area between the two images based upon a number of the iterative low-pass filtering.

40. The system for composing an image according to claim 39 wherein the amount of the focus difference is user-adjustable.

41. The system for composing an image according to claim 39 wherein the amount of the focus difference is expressed in a blurring function.

42. A computer program containing instructions for performing acts of composing an image from a plurality of images, the acts comprising:
   inputting a plurality of the images containing the same objects;
   matching a relative position between two of the images based upon a predetermined set of movements;
   providing a user input unit for confirming a match in the relative position between the two of the images;
   determining at least one common in-focus area between the two images;
   determining an amount of difference in focus in the one common in-focus area between the two images; and
   composing an image from the two inputted images based upon the above determined amount of the difference in focus.

43. The computer program according to claim 42 wherein the in-focus area determination further comprises:
   dividing each of the inputted images into a predetermined number of blocks;
   summing pixel values of each of the blocks for each of the inputted images;
   determining a difference in the summed pixel values between a corresponding pair of the blocks of the inputted images; and
   selecting a block having a largest amount of the difference in the summed pixel values as the common in-focus area.

44. The computer program according to claim 43 wherein the common in-focus area is user-adjustable.

45. The computer program according to claim 43 wherein the focus difference determination further comprising:
   iteratively low-pass filtering the common in-focus area of one of the inputted images;
   determining whether or not the low-pass filtered common in-focus area substantially matches the common in-focus area of another inputted images; and
   determining the amount of the focus difference in the one common in-focus area between the two images based upon a number of the iterative low-pass filtering.

* * * * *